March 4, 1924.
W. N. ALLAN
LIGHTING MEANS
Filed April 23, 1921  2 Sheets-Sheet 1
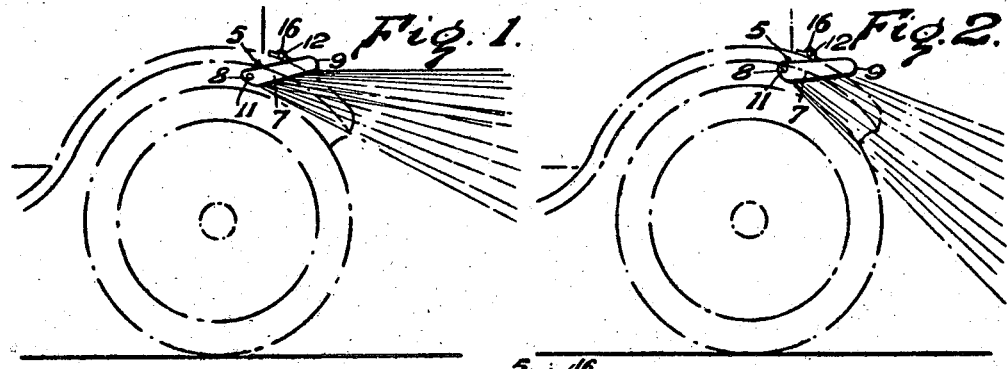
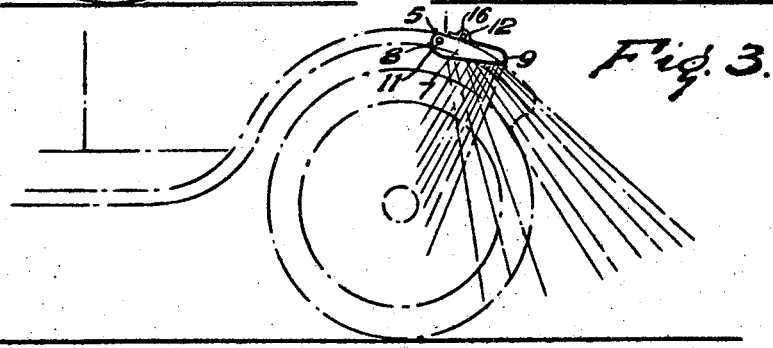
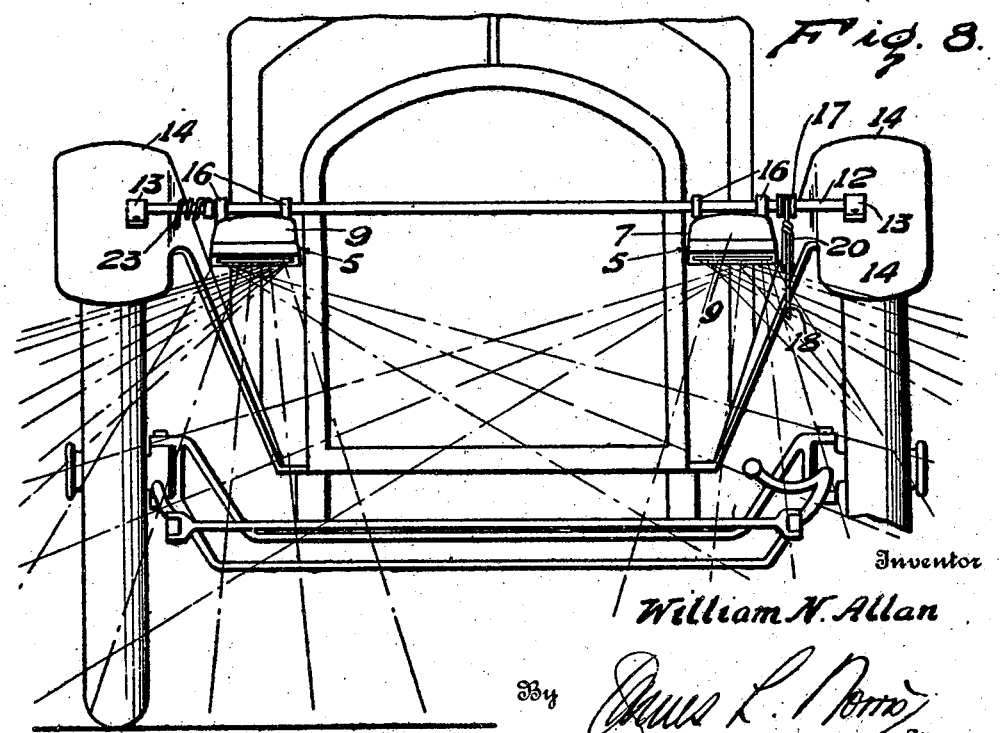
Inventor
William N. Allan
By James L. Norris
Attorney

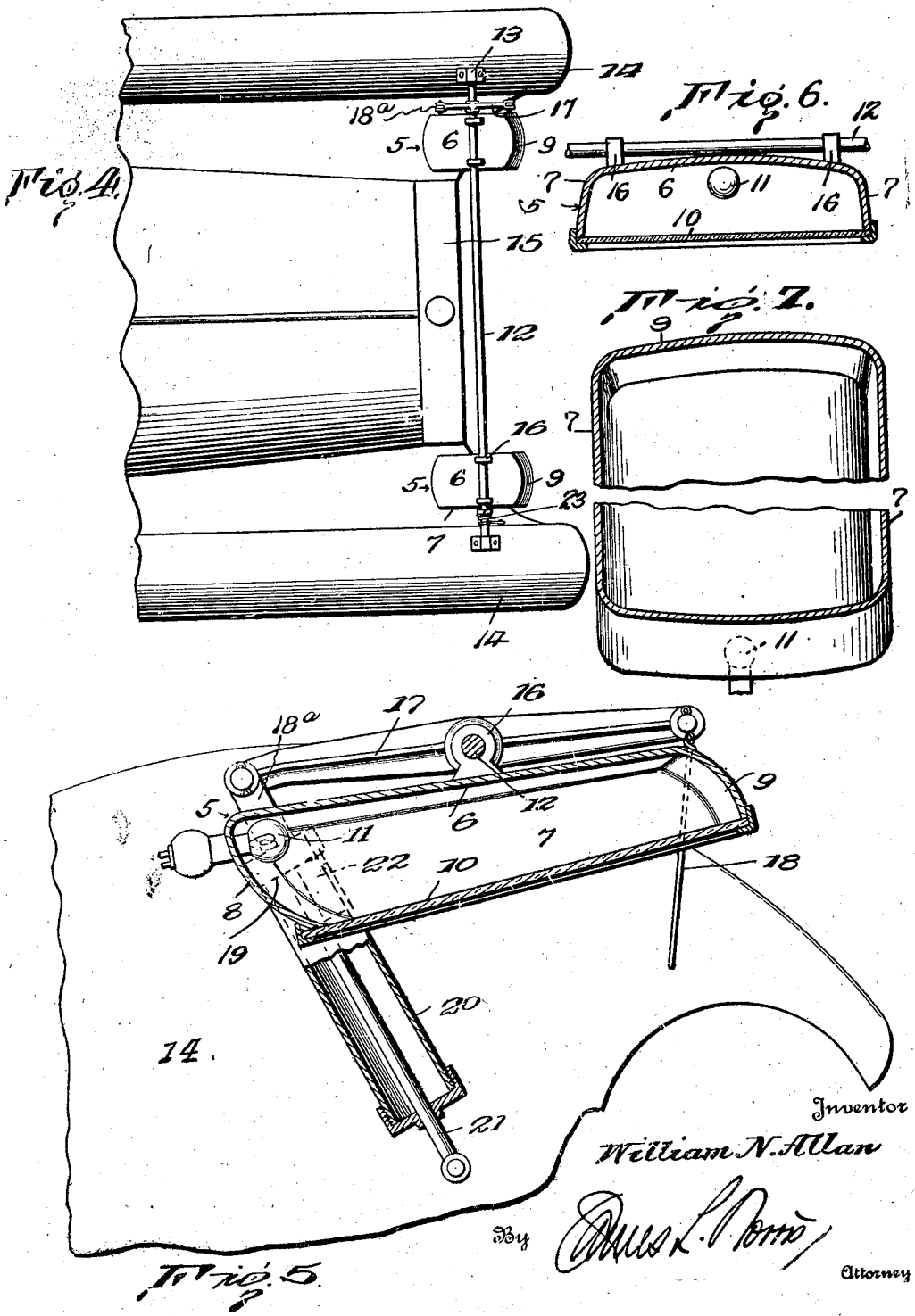

Patented Mar. 4, 1924.

1,486,000

UNITED STATES PATENT OFFICE.

WILLIAM N. ALLAN, OF SAN ANTONIO, TEXAS, ASSIGNOR TO THE ALLAN AUTOMOBILE ACCESSORY ASSOCIATION, INCORPORATED, OF BALTIMORE, MARYLAND, A CORPORATION OF MARYLAND.

LIGHTING MEANS.

Application filed April 23, 1921. Serial No. 463,776.

*To all whom it may concern:*

Be it known that I, WILLIAM N. ALLAN, a citizen of the United States, residing at San Antonio, in the county of Bexar and State of Texas, have invented new and useful Improvements in Lighting Means, of which the following is a specification.

This invention relates to lighting means or organizations such as headlights for automobiles, motor boats, vehicles generally, and for other applications where the present improved form of lighting means may be useful and practicable.

The essential object of the invention is to entirely eliminate glare of projected light rays in a headlight or similar lighting organization comprising a light-producing source of any power, without resorting to light ray obscuring hoods, shields or front glasses having prismatic or other light ray diffusing and excluding means. A further object of the invention is to provide a headlight or other lighting organization mounted to move into various positions for either projecting the light rays straight ahead, downwardly at an angle in advance of the front of an automobile or other vehicle and in part against the front of the vehicle below the headlight, or to cast the light rays almost exclusively against the front of the automobile or vehicle below the headlights or lighting organizations, and also to cast the light laterally beyond the front wheels of the vehicle in opposite directions to always illuminate the front side portions of the automobile or vehicle, the illumination of the front and opposite side portions and front wheels of the automobile or vehicle serving as a mutual advantage to the drivers of approaching machines for guidance in passing as well as observation of the roadway, without the inconveniences and frequent danger ensuing from strong forwardly projected blinding light rays of the ordinary form of headlights. A still further object of the invention is to provide a headlight or lighting organization particularly adapted for automobiles wherein the parts are materially simplified, and by which a strong reflected light may be obtained, in view of the provision of an increased reflecting surface or means within the headlight, which may be formed directly on the interior of the casing, or be provided by the use of a reflecting glass mirror arranged as a lining for the casing.

One embodiment of the improved headlight or lighting organization is shown in the accompanying drawings.

In the drawings:

Figs. 1, 2 and 3 illustrate side elevations of the front portions of automobiles, showing the improved headlight or lighting organization applied thereto and adjusted to various positions.

Fig. 4 is a top plan view of the forward extremity of an automobile, showing the improved headlight or lighting organization applied thereto.

Fig. 5 is a longitudinal vertical section of one of the headlights, or lighting organizations shown on an enlarged scale, and a portion of the mounting and operating devices therefor in part also illustrated broken away and in section.

Fig. 6 is a transverse vertical section through the improved headlight on a smaller scale than that of Fig. 5.

Fig. 7 is a bottom sectional plan view of the improved headlight broken through the center and showing the glass covering removed and on the same scale as Fig. 6.

Fig. 8 is an enlarged front end elevation, partially broken away, of an automobile having the improved headlights applied thereto, and showing how rays of light are laterally cast thereby at opposite sides and over the front of the automobile.

In the form of the headlight shown in the drawings a body 5 is produced and may consist of one integral piece or a unitary structure formed by casting, or a number of pieces varying in thickness and assembled to provide a casing. The specific structure of the body 5, so far as the assemblage of parts, or whether it be composed of one or more parts, is not essential, it being proposed to modify the structural componency of the body in accordance with the particular application and use of the improved headlight and economy and convenience from a commercial standpoint. The body 5 comprises a concavo-convex top 6, opposite slightly outwardly curved sides 7, a rear end or wall 8, and a front end or wall 9. The rear end or wall 8 and the front narrower end or wall 9 are reversely curved, the arcs of these ends or walls being devised in accordance with the best results in controlling the projection of light rays, as will be more fully hereinafter described. By forming the rear end or wall 8 wider than the end or wall 9, the body 5 is given a tapering or converging contour towards the said front end or wall 9. The lower side of the body 5 is fully open between the lower edges of the sides 7 and the rear and front ends or walls 8 and 9, and when the equipment of the improved headlight is completed, a flat glass 10 is secured over said open lower side by any preferred means. The light producing source 11 is applied at the center of the upper part of the rear end or wall 8, and it is proposed preferably to use an electric light of high candle power. The location of this source of light, it will be seen, is close to the top or upper covering 6 of the body, or in a position where the said source of light may be completely hidden from front view when the improved headlight is adjusted or moved to various positions, or to positions other than that which will cause the headlight to project light rays therefrom forwardly in horizontal lines, or longitudinally in advance of the vehicle to which the improved light is applied. The use of a high power light source is permissible in the present improved headlight in view of the absolute control of the intense light rays projected from the headlight, and due to the improved structure of the body and the mounting of the latter for adjustment. The whole interior surface, or the surfaces of the top or covering 6, the sides 7, and the rear and front ends or walls 8 and 9 are provided with reflecting means, which may be directly applied to the material of which said parts are formed, or separate reflecting mirror surfaces may be introduced of such dimensions as may be found necessary, the method of forming or producing these reflecting surfaces being immaterial, it being only necessary to have the whole interior surface of the body serve as a reflecting means. To insure a regularity in projection of light rays in different directions from the interior reflecting surface or surfaces, the enclosing walls of the body will all be shaped at their points of intersection to avoid angular portions, all of the intersecting portions of the sides, ends and top walls being curved to obtain the best results in accordance with the features of the invention, and these curvatures may be arcs with either long or short radii.

The improved headlight is shown in the accompanying drawings as being applied to an automobile, for the reason that such application constitutes one of its most advantageous services, and the position of the improved headlight on an automobile is practically the same as that of an ordinary headlight, or at the front end of the machine adjacent to the radiator and between the latter and the front mud guards. The improved headlight, however, is not confined to this exact application on an automobile and may be modified in its position of use by supporting it in connection with some other part or parts. As one preferred application to an automobile, the improved headlight is pivotally supported on a cross rod 12 held at its ends in suitable bearing devices 13 secured on the mud guards 14 and located in advance of the front of the radiator 15. One of the improved headlights is operatively held in connection with the rod 12 at each side of the radiator and between the latter and the adjacent mud guard, and as one convenient means of mounting the headlight on the rod 12, the top or covering 6 is provided with spaced lugs or upstanding ears 16 arranged in transverse alinement and having openings therethrough to receive the said rod 12. The lugs or ears 16 are secured to the rod 12 so that the oppositely disposed headlights move uniformly with the rod 12, and the latter is provided with a crank arm 17, which will have a pull device 18 attached to the front extremity thereof and running back to the body of the machine within easy reaching distance of the driver for ready manipulation to control the position of the headlights as may be desired. The rear end of the crank arm 17 is attached to an arm 18$^a$ of a dash pot cap 19 of a dash pot 20 of the usual form. The dash pot is being movably attached through the medium of a rod 21 projecting from the opposite end thereof to a part of the adjacent mud guard as shown by Fig. 5. The dash pot 20 is thus mounted to bodily swing in accordance with the movement of the crank arm 17. The rod 21 also serves as a piston rod attached to a piston 22, which is mounted and operates in the dash pot in a well known manner. As the crank arm 17 is rocked and raised at its rear extremity, the dash pot 20 swings forward and at the same time the said dash pot, through the attachment of the cap thereof to the crank arm 17, is drawn upwardly and the piston 22 moves toward the lower end of said dash pot and draws therein a charge of air, this dash pot, as above noted, being of the ordinary structure and having the well understood function of devices of this character. At the opposite side of the machine a spring 23 is applied to the rod 12 between the headlight and the adjacent mud guard 14, the extremities of this spring being respectively secured to the rod 12 and the mud guard. This spring 23 operates to restore the headlights to normal position subsequent to an adjustment, and the dash pot 20 performs the function of cushioning the movement of the parts when resuming normal position without shock or jar. When the dash pot components have automatically restored themselves to normal position, the headlights will occupy the normal position as shown by Fig. 1, or to project light rays forwardly therefrom in advance of the machine.

When the headlights are set at normal positions in accordance with the desired mounting thereof at an upward and inward angle on the rod or shaft 12, for instance, as shown by Fig. 1, the light rays will be projected forwardly in a longitudinal direction to a great extent beyond the front of the machine or vehicle with considerable concentration and also lateral spread, with obvious advantages incident to a complete illumination of the roadway, especially during touring. When it is desired to check the forward or longitudinal projection of the light rays, as shown by Fig. 1, the headlights or lighting organizations are adjusted as shown by Fig. 2 to cast the light rays downwardly at an angle in front of the machine or vehicle a sufficient distance as may be desired to illuminate the roadway, but at the same time eliminate all longitudinal light ray projection and thereby materially reduce the glare which is always confusing both to pedestrians passing in front of machines or vehicles carrying headlights of the usual type, and also to opposing drivers controlling machines approaching from opposite directions. A still further and very materially advantageous adjustment of the headlights or lighting organizations is shown by Fig. 3, and whereby all of the light rays are directed at a rearward angle or against the front of the machine or vehicle downwardly on the roadway to thoroughly illuminate the vehicle end and provide safe directing or guiding means for drivers of machines approaching from opposite directions, the one driver, for instance, under the projection of the light rays as shown by Fig. 3 being guided by the illumination of the front of the machine towards which his machine is approaching. This rearward adjustment and illumination of the front end of the machine or vehicle will also serve to clearly show pedestrians or persons crossing the thoroughfare in advance of approaching machines or vehicles the location of the latter as to distance therefrom.

One of the most important advantages of the improved headlight is the increased range of lateral projection of the light rays therefrom in opposite directions, and when two of the headlights are applied to the front end of an automobile, the lateral rays from the two headlights will cross and create an intense light over the front end of the machine, including the front wheels and also out beyond the latter to the sides of the roadway. Should the light source of one headlight burn out, the remaining headlight by its extended lateral light reflection will be sufficient to fully illuminate the roadway at opposite sides beyond the front wheels and thus avert accidents so common where machine are running with one light out, which latter condition will leave the one side of the machine dark.

What is claimed as new is:

1. A lighting organization comprising a body fully open at the bottom and normally disposed at an upward angle of inclination, the body having closed sides, front and rear ends and top, the front end of the body having less depending extent from the top than the rear end and the sides correspondingly decreasing in dependence towards the said front end, a light source mounted in the center of the rear end of the top, the interior portion of all parts of the body having smoothly merging and reversed curved contours, and means for mounting and adjusting the body and operable to always return the body to predetermined normal inclined position and maintain the light source above the lower edge of the front end of the body.

2. A lighting organization comprising a body having an open bottom and integral closed sides, front and rear ends and top, the inner portions of all parts of the interior body being of a reflecting character, the front end of the body being shorter than the rear end and the top having a curved arched contour and the sides reversely and convergingly curved downwardly and the ends also reversely curved in a downward direction, a light source mounted in the upper portion of the rear end of the body close to the top, and means for mounting and adjusting the body and maintaining the light source always above the lower edge of the front end of the body.

3. A lighting organization comprising a body with closed top, sides and ends and tapering towards its front end and provided with an open bottom, the body having the entire inner surface composed of curved portions at different angles and formed as a reflecting surface, the front and rear ends being reversely curved and of different arcuate form, a light source mounted in the rear end of the body adjacent to the top of the latter, and means for mounting the body at an upward and forward angle of inclination and for adjusting the same to various positions but to always maintain the light source above the lower end of the front of the body, the body being adjustable to throw all of the reflected light against the front of the device to which the body is applied and also equally in opposite lateral directions.

4. A lighting device of the character specified, comprising a body with a closed top and having the whole interior provided with reflecting means, the body tapering from the rear to the front end and the bottom of the body between the lower edges of the sides and ends being fully open, the rear end of the body being curved downwardly and forwardly and the front end having a shorter downward extent than the rear end and also curved downwardly, means for mounting and always maintaining the body at a predetermined normal upward angle of inclination and for adjusting the body to various angular positions relatively to a horizontal plane, and a light source mounted in the center of the rear end of the body close to the top of the latter, the light source being always located above the lower edge of the front end of the body.

5. A lighting device of the character specified comprising a body with a curved top, opposite upwardly and downwardly curved closed sides and downwardly curved ends, the whole interior of the body being provided with reflecting means and the bottom thereof fully open for the projection of light rays therethrough, the rear end of the body being longer than the front end, a light source mounted in the rear end of the body adjacent to the top of the latter, and means for adjusting the body and always maintaining the light source above the lower edge of the front end.

6. A lighting device of the class specified comprising a body with a closed top, opposite side and front and rear ends, the front and rear ends being reversely curved and the rear end longer than the front end, the bottom of the body being fully open and the whole interior thereof formed with a reflecting surface, and a light source mounted in the rear end of the body close to the top, the longitudinal rays of light projected from the light source being directly cast upon the front end of the body and always disposed at an elevation above the lower end of the front edge of the body.

7. A lighting device having a body of substantially rectangular contour and provided with a fully open lower side, upwardly curved closed top, forward and rear reversely curved ends and opposite reversely curved sides, the rear end of the body being longer than the front end and the whole interior of the body provided with reflecting means, a light source applied to the center of the rear end of the body near the top, and means for mounting and adjusting the body to always maintain the latter normally at an upward and forward angle of inclination above a horizontal plane and to prevent direct longitudinal projection of the light rays from the light source above the lower edge of the front end.

8. A lighting organization of the class specified comprising a body of substantially rectangular form, the body having a closed top, opposite sides and front and rear ends and fully open bottom, the whole interior of the body being provided with reflecting means, the body being tapered from its rear toward its front end and thereby reducing the downward extent of the front end relatively to the rear end, a lighting source mounted in the center of the rear end close to the top of the body, and means for applying and adjusting the body and light source and always maintaining the latter when normally positioned at an upward and forward angle of inclination and preventing the light rays from the light source from being projected directly longitudinally through the front end of the body.

9. The combination with the front of an automobile, of a rod extending across the same and mounted to have partial rotatable movement, a crank arm secured to one extremity of said rod and projecting in advance and in rear of said rod, a pull device attached to the forward end of the crank arm, a cushioning means attached to the rear end of the crank arm and to a portion of the automobile, and lighting devices secured to and movable with the rod and disposed at opposite sides of the center of the automobile for unitary adjustment, each lighting device being closed at the top, sides and front and rear ends and fully open at the bottom, the lighting devices being simultaneously adjustable to either project the light rays forward longitudinally or at a downward angle or wholly against the front of the automobile and laterally at opposite sides of the latter, the cushioning means checking the jar and shock of the lighting devices when returning to normal position.

In testimony whereof I have hereunto set my hand.

WILLIAM N. ALLAN.